US012768557B2

(12) United States Patent
Hussein

(10) Patent No.: US 12,768,557 B2
(45) Date of Patent: Oct. 20, 2026

(54) CONTROL SYSTEMS, METHODS, AND ALGORITHMS TO OPTIMIZE VAPOR-COMPRESSION SYSTEMS, INCLUDING REFRIGERATION, HEAT PUMP AND CHILLER OPERATIONS

(71) Applicant: Ahmed Hussein, West Bloomfield, MI (US)

(72) Inventor: Ahmed Hussein, West Bloomfield, MI (US)

( * ) Notice: Subject to any disclaimer, the term of this patent is extended or adjusted under 35 U.S.C. 154(b) by 329 days.

(21) Appl. No.: 18/592,624

(22) Filed: Mar. 1, 2024

(65) Prior Publication Data

US 2024/0295337 A1 Sep. 5, 2024

Related U.S. Application Data

(60) Provisional application No. 63/488,338, filed on Mar. 3, 2023.

(51) Int. Cl.

| | |
|---|---|
| ***F24F 11/63*** | (2018.01) |
| ***G05B 23/02*** | (2006.01) |
| *F24F 110/10* | (2018.01) |
| *F24F 110/20* | (2018.01) |
| *F24F 130/10* | (2018.01) |
| *F24F 140/10* | (2018.01) |

(52) U.S. Cl.

CPC .......... *F24F 11/63* (2018.01); *G05B 23/0254* (2013.01); *F24F 2110/10* (2018.01); *F24F 2110/20* (2018.01); *F24F 2130/10* (2018.01); *F24F 2140/10* (2018.01)

(58) Field of Classification Search

CPC .... F24F 11/63; F24F 2110/20; F24F 2130/10; F24F 2140/10; F24F 2110/10; G05B 23/0254

See application file for complete search history.

(56) References Cited

U.S. PATENT DOCUMENTS

| | | | | |
|---|---|---|---|---|
| 5,911,747 | A * | 6/1999 | Gauthier | F24F 11/30 62/93 |
| 8,589,111 | B2 * | 11/2013 | Simons | F24F 11/30 702/122 |
| 8,825,184 | B2 | 9/2014 | Burns | |
| 8,881,541 | B2 | 11/2014 | Noll et al. | |

(Continued)

*Primary Examiner* — Ramsey Refai

(74) *Attorney, Agent, or Firm* — Dunlap Bennett & Ludwig PLLC

(57) ABSTRACT

A method includes receiving condition data including one or more of temperature measurements, pressure measurements, humidity measurements, location coordinates, or a weather forecast for a future time period. The method includes applying, to a predictive machine learning model, the condition data and predictive data generated from a mathematical model of the physical operation of the environment system. The predictive machine learning model is configured to output optimal commands to operational components of the environmental system. The method includes applying the optimal commands to a failure machine learning model. The failure machine learning module is trained to output modified commands that address potential failures in the operational components of the environmental system. The method includes transmitting the modified commands to the operational components of the environmental system.

10 Claims, 5 Drawing Sheets

(56) References Cited

U.S. PATENT DOCUMENTS

| | | | | |
|---|---|---|---|---|
| 8,886,488 | B2 * | 11/2014 | Steinberg | F24F 11/62 702/182 |
| 10,724,752 | B2 * | 7/2020 | Dyess | F24F 11/62 |
| 10,761,547 | B2 | 9/2020 | Risbeck et al. | |
| 10,989,427 | B2 * | 4/2021 | Maslekar | F24F 11/32 |
| 11,137,730 | B2 * | 10/2021 | McDaniel | G05B 15/02 |
| 11,530,835 | B2 * | 12/2022 | Hafernik | F24F 11/61 |
| 11,639,804 | B2 * | 5/2023 | Vause | F24F 11/56 700/276 |
| 11,692,750 | B1 | 7/2023 | Khatami et al. | |
| 11,713,895 | B2 * | 8/2023 | Bloemer | F24F 11/59 700/276 |
| 11,892,185 | B1 * | 2/2024 | DeLoach | F24F 11/58 |
| 11,959,652 | B2 * | 4/2024 | Fujita | F24F 3/001 |
| 12,227,307 | B2 * | 2/2025 | Leitch | B64F 5/40 |
| 2005/0159846 | A1 * | 7/2005 | Van Ostrand | F24F 11/30 700/276 |
| 2005/0228607 | A1 * | 10/2005 | Simons | G01M 99/005 702/122 |
| 2007/0288208 | A1 * | 12/2007 | Grigsby | G06Q 10/06 703/2 |
| 2015/0354877 | A1 | 12/2015 | Burns et al. | |
| 2016/0098639 | A1 * | 4/2016 | Choe | G05B 13/00 706/12 |
| 2017/0308802 | A1 * | 10/2017 | Ramsøy | G06N 20/00 |
| 2017/0343228 | A1 * | 11/2017 | Dyess | F24F 11/46 |
| 2017/0352204 | A1 * | 12/2017 | Huet | B64D 45/00 |
| 2019/0095148 | A1 * | 3/2019 | Celinder | G06F 3/1285 |
| 2021/0018206 | A1 * | 1/2021 | Barooah | F24F 11/52 |
| 2021/0191342 | A1 | 6/2021 | Lee et al. | |
| 2023/0063986 | A1 * | 3/2023 | Butler | F24F 11/46 |
| 2023/0170697 | A1 * | 6/2023 | Powers | H02J 3/004 700/291 |

* cited by examiner

CONTROL SYSTEMS, METHODS, AND ALGORITHMS TO OPTIMIZE VAPOR-COMPRESSION SYSTEMS, INCLUDING REFRIGERATION, HEAT PUMP AND CHILLER OPERATIONS

CROSS-REFERENCE TO RELATED APPLICATIONS

This application claims the benefit of priority of U.S. provisional application No. 63/488,338, filed Mar. 3, 3023, entitled "CONTROL SYSTEM TO OPTIMIZE HEAT PUMP OPERATION FOR USE IN RESIDENTIAL COMMERCIAL AND AUTOMOTIVE APPLICATIONS" the entire contents of which are herein incorporated by reference.

FIELD

The present disclosure relates to heat pumps, chillers, sensors, and controllers and, more particularly, to control systems and methods for heat pump and chiller operations.

BACKGROUND

Existing control systems are designed to monitor heat pump/chiller operations for the purpose of identifying potential heat pump component failures and lack a robust framework of sensors capable of optimizing operations for the purpose of minimizing energy consumption. Stated differently, existing control software does not use physics and mathematical models of a heat pump/chiller system and hence does not provide energy efficient operations.

As can be seen, there is a need for a control system having a more robust system of logic to improve heat pump/chiller operations that addresses the above drawbacks.

SUMMARY

In one aspect of the present disclosure, a method for controlling an operation of an environmental system includes receiving condition data including one or more of temperature measurements, pressure measurements, humidity measurements, location coordinates, or a weather forecast for a future time period. The method includes applying, to a predictive machine learning model, the condition data and predictive data generated from a mathematical model of the physical operation of the environment system. The predictive machine learning model is configured to output optimal commands to operational components of the environmental system. The method includes applying the optimal commands to a failure machine learning model. The failure machine learning module is trained to output modified commands that address potential failures in the operational components of the environmental system. The method includes transmitting the modified commands to the operational components of the environmental system.

In another aspect of the present disclosure, a computer-readable medium stores instructions for causing one or more processors to perform a method. The method for controlling an operation of an environmental system includes receiving condition data including one or more of temperature measurements, pressure measurements, humidity measurements, location coordinates, or a weather forecast for a future time period. The method includes applying, to a predictive machine learning model, the condition data and predictive data generated from a mathematical model of the physical operation of the environment system. The predictive machine learning model is configured to output optimal commands to operational components of the environmental system. The method includes applying the optimal commands to a failure machine learning model. The failure machine learning module is trained to output modified commands that address potential failures in the operational components of the environmental system. The method includes transmitting the modified commands to the operational components of the environmental system.

In another aspect of the present disclosure, an environmental system controller that includes one or more memory devices storing instructions and one or more processors. The one or more processors are configured to execute the instructions to perform a method. The method receiving condition data including one or more of temperature measurements, pressure measurements, humidity measurements, location coordinates, or a weather forecast for a future time period. The method includes applying, to a predictive machine learning model, the condition data and predictive data generated from a mathematical model of the physical operation of the environment system. The predictive machine learning model is configured to output optimal commands to operational components of the environmental system. The method includes applying the optimal commands to a failure machine learning model. The failure machine learning module is trained to output modified commands that address potential failures in the operational components of the environmental system. The method includes transmitting the modified commands to the operational components of the environmental system.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

Figure 3:
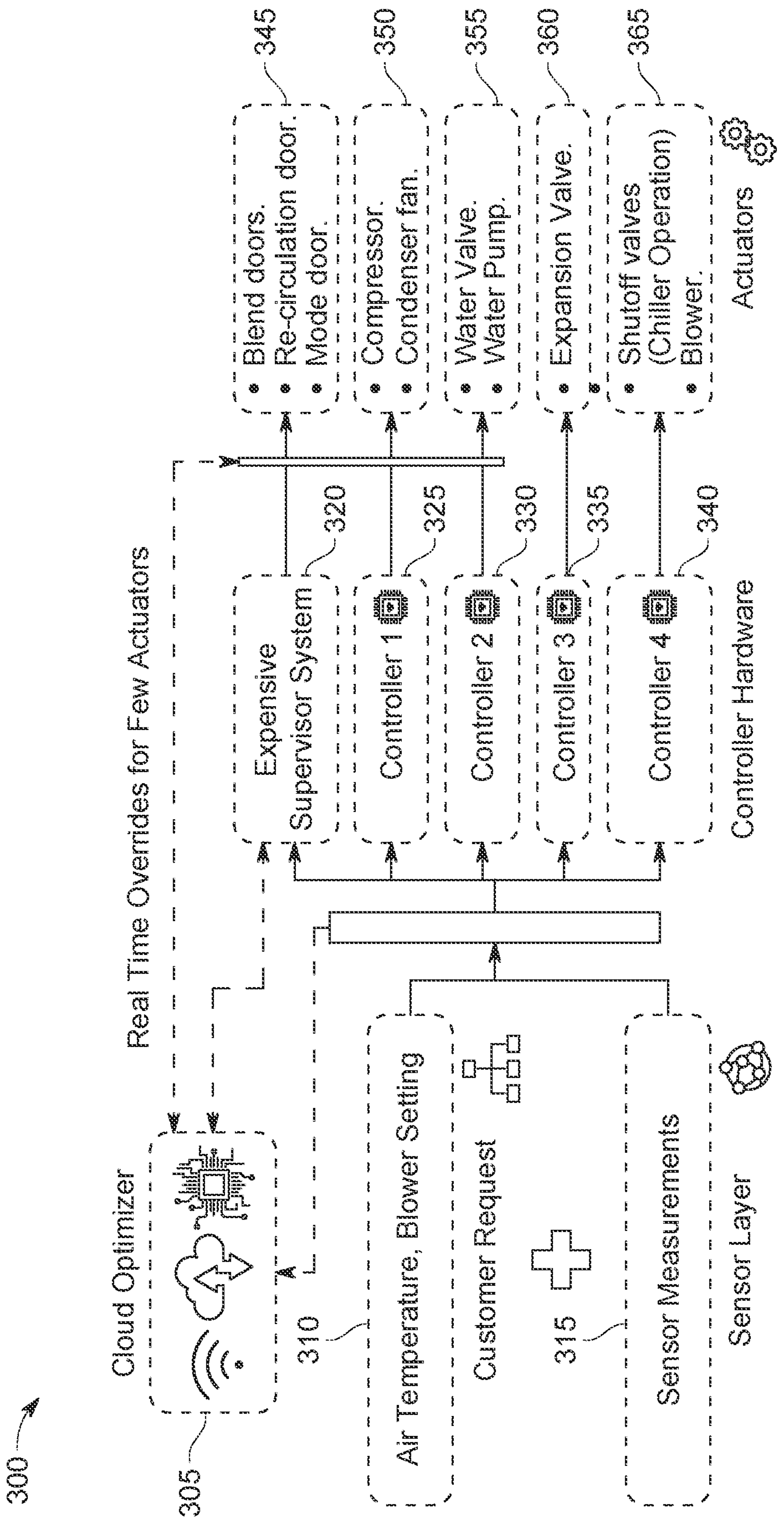
FIG. 3 is a block diagram of a typical building chiller control layer architecture, according to aspects of the present disclosure.

As discussed above, current heat pump/chiller controllers only guarantee energy efficiency during 25-50% of the system's operating time and work only for a few configurations, e.g., max of chiller systems connected. Current heat pump/chiller optimization controllers require after-installation site re-visit service tuning of proportional-integral-derivative controllers algorithms and hence add labor cost on the customer. Further, current heat pump controllers require access to high-speed internet and cloud storage, requiring a vast amount of data to be stored with minimal gain in efficiency, and only work on a specific type of application or structure, e.g., commercial building, as illustrated in FIG. 3.

Broadly, an embodiment of the present disclosure provides an optimized heat pump/chiller controller and control algorithm that reduces energy used in heat pump/chiller operation in residential, commercial and automotive applications.

Figure 1:
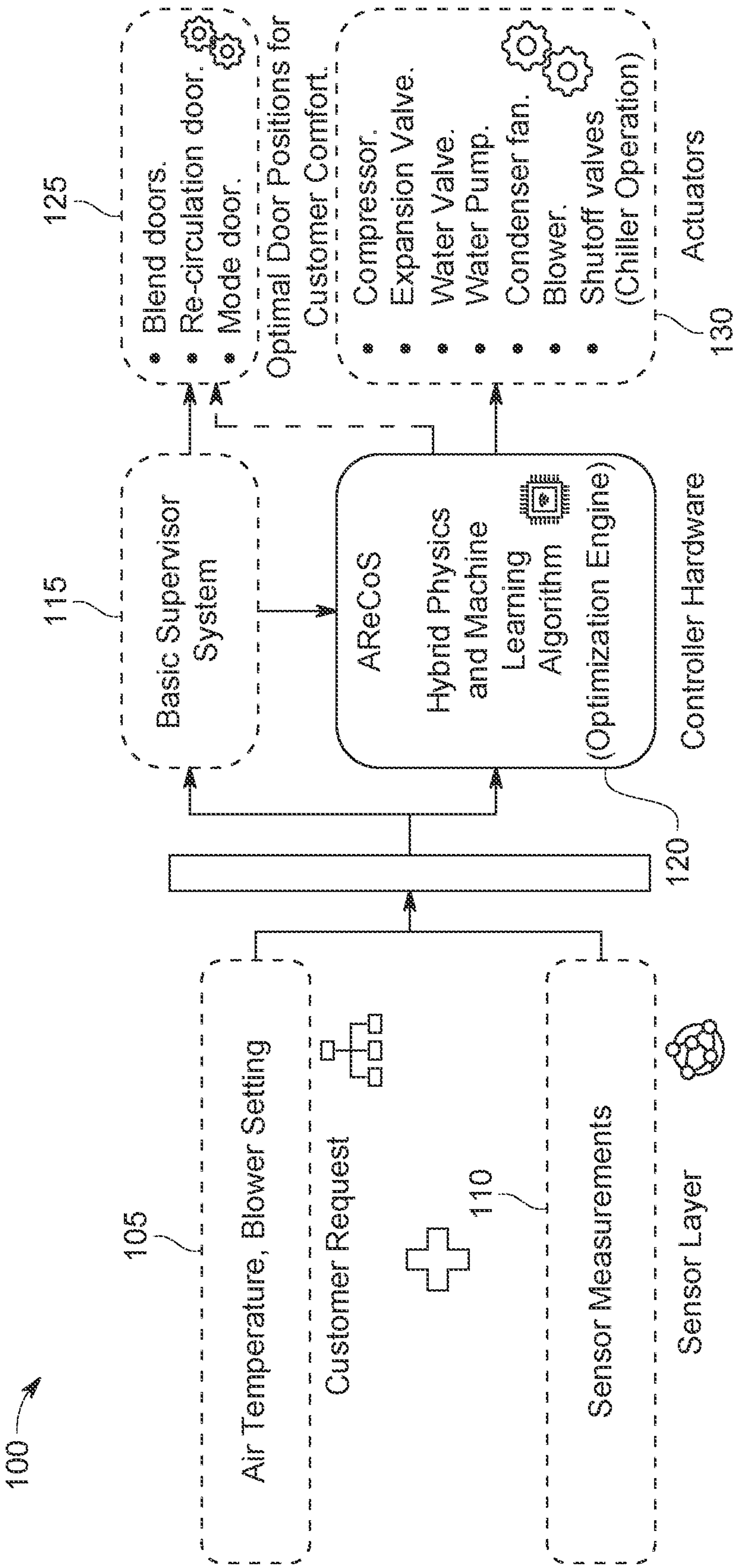
FIG. 1 is a block diagram of a developed heat pump/chiller control layer architecture, according to aspects of the present disclosure.

Referring now to FIGS. 1-7, FIG. 1 illustrates a developed heat pump/chiller control layer architecture 100, according to aspects of the present disclosure. While FIG. 1 illustrates examples of components of control layer architecture 100, additional components can be added, and existing components can be removed and/or modified.

As illustrated in FIG. 1, the control layer architecture 100 includes adaptive controller software 120 (software 120) that can be installed on a controller of a heat pump/chiller to control the operation of a heat pump/chiller. The software 120 includes a hybrid physics and machine learning algorithm (optimization engine) that reduces energy used in heat pump/chiller operation. The software 120 can be utilized in any type of heat pump/chiller application, e.g., in residential, commercial, and automotive applications. The software 120 can operate on any heat pump/chiller system configuration, for example, single and/or multiple evaporator/condenser connected in series or parallel; single and/or multiple compressors and/or expansion valves connected in series or parallel; single and/or multiple fan/blowers connected in series or parallel; and single and/or multiple water pumps/water valves connected in series or parallel.

The software 120 receives pressure, temperature, and humidity sensor information for liquid, air, and freon involved in the heat pump mechanical system (sensor measurement 110), and weather forecast and GPS data for the future time period, e.g., 6-12 hours, 6-24 hours, etc. The software 120 automatically controls, in concert with a basic supervisor system 115, the heat pump/chiller system in a manner that minimizes the energy consumption over the same amount of weather forecasting period, while meeting the customer settings, e.g., air temperature, blower setting, etc., established at a thermostat or other interface. That is, the software 120 provides control signals to doors 125 (e.g., blend doors, re-circulation doors, mode doors, etc.) and actuators 130 (e.g., compressor, expansion valve, water pump, condenser fan, blower, shutoff valves, etc.).

In embodiments, the software 120 optimizes the energy efficiency while avoiding hardware failure. For example, the software 120 can avoid failure of the condenser fan, expansion valve, compressor, and other mechanical/electrical actuators in the heat pump system through the prediction of the best course of action as time evolves.

In embodiments, the hybrid physics and machine learning predictive control algorithm of the software 120 is based on a physics-based mathematical model. The mathematical model includes ordinary differential equations (ODEs) that describe how the heat pump states (pressure, temperature enthalpy, specific energy, air flow rate, mass flow rate and other states for air/refrigerant in the system) evolved over time. The mathematical model is obtained by transforming the partial-differential energy equations into ODEs. The mathematical model parameters includes geometrical and material properties determined from in-lab testing and/or standard engineering handbook for materials and refrigerants. In some embodiments, the mathematical model can be trained for specific heat pump/chiller models. The forecast and GPS data are fused with the optimal control actions through a machine learning algorithm to determine the one set of actions that best minimizes the energy consumption over the course of the same forecasted weather conditions.

The software 120 includes a machine learning algorithm that is trained to accept, as input, optimal actuator commands that optimize energy consumption and were generated by the model predictive control algorithm. The machine learning algorithm is configured to determine if the actuator commands pose a hardware failure situation. The machine learning algorithm is configured to modify the actuator commands to avoid potential hardware failures, which are then transmitted to the components of the heat pump/chiller.

In some embodiments, the software 120 comprises an online optimizer where model predictive control techniques and a set of finite optimal control actions are determined for the mechanical and electrical components, e.g., doors 125 and actuators 130. The online optimizer is tailored to the number and size of computational resources available as memory and CPU.

In embodiments, a controller on which the software 120 is installed can include a processing device that is coupled to a memory device and communication interface. The memory device can store a copy of the software 120, including the hybrid physics and machine learning algorithm, and/or other control software that when executed by the processing devices controls the operation of the heat pump/chiller. In embodiments, the communication interface enables the software 120 to communicate with other devices and systems via one or more networks.

The processing device, the communication device, and the memory device can be interconnected via a system bus. The system bus can be and/or include a control bus, a data bus, an address bus, and the like. The processing device 104 can be and/or include a processor, a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and the like. As used herein, "processor," "processing component," "processing device," and/or "processing unit" can be used generically to refer to any or all of the aforementioned specific devices, elements, and/or features of the processing device. While a single processing device is described above, the controller can include multiple processing devices, whether the same type or different types.

The memory device can be and/or include one or more computerized storage media capable of storing electronic data temporarily, semi-permanently, or permanently. The memory device can be or include a computer processing unit register, a cache memory, a magnetic disk, an optical disk, a solid-state drive, and the like. The memory device can be and/or include random access memory ("RAM"), read-only memory ("ROM"), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device.

While a single memory device is described above, the controller can include multiple memory devices, whether the same type or different types.

The communication device can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network. programming installed on a processor, such as the processing component, coupled to the antenna.

An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

In embodiments, the components and functionality of the software 120 can be hosted and/or instantiated on a "cloud" and/or "cloud service." As used herein, a "cloud" and/or "cloud service" can include a collection of computer resources that can be invoked to instantiate a virtual machine, application instance, process, data storage, or other resources for a limited or defined duration. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

Figure 2:
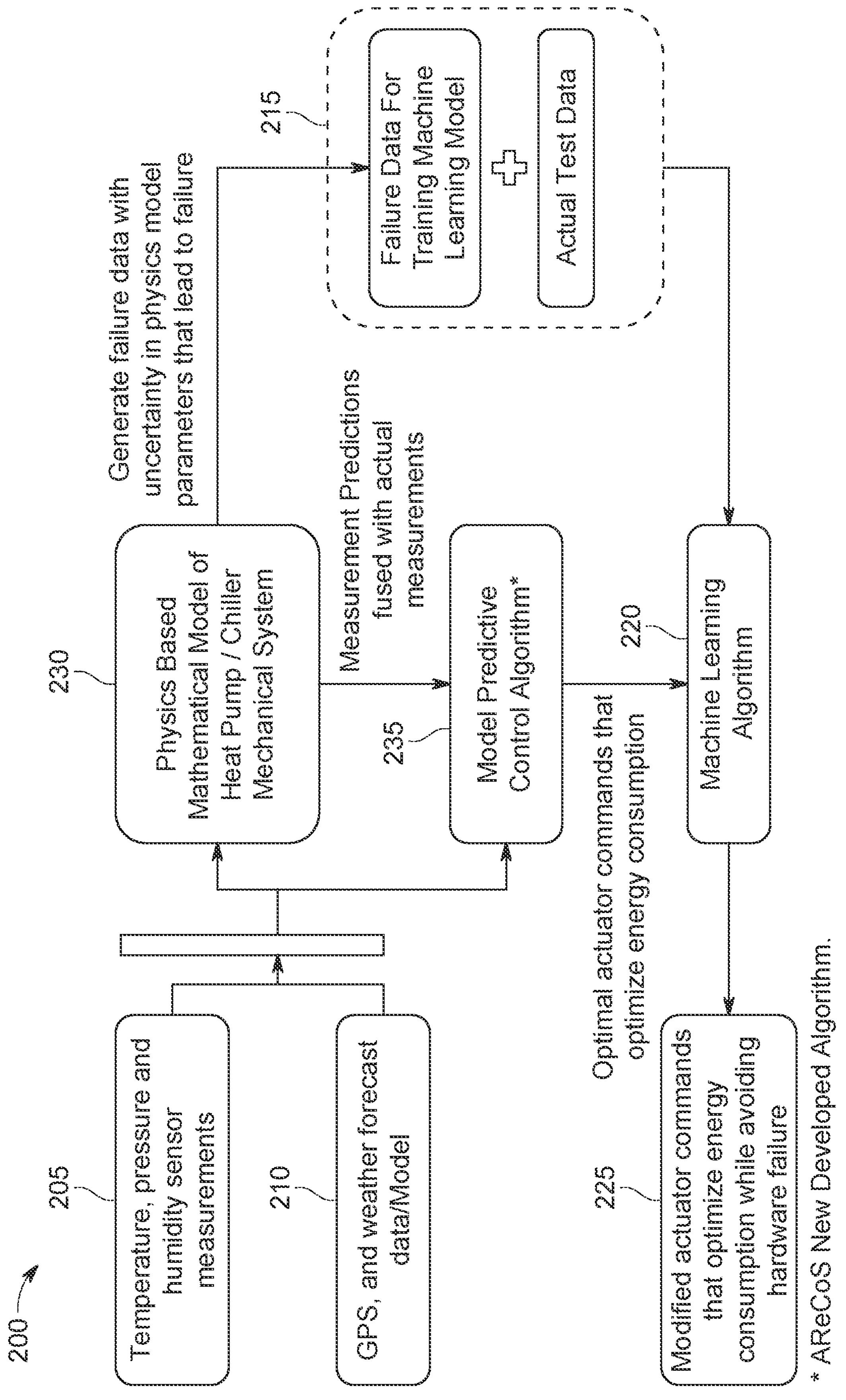
FIG. 2 is a block diagram of a developed heat pump/chiller algorithm architecture, according to aspects of the present disclosure.

FIG. 2 illustrates a process of using the software 120, according to aspects of the present disclosure. In stages 205 and 210, the software 120 receives sensor measurements, e.g., pressure, temperature, and humidity sensor information for liquid, air, and freon involved in the heat pump mechanical system, and weather forecast and GPS data for the future time period, e.g., 6-12 hours, 6-24 hours, etc.

In stage 230-235, before installing the software 120 on the microcontroller (Offline), in stage 230, the physical mathematical model (ODEs) is numerically integrated to provide a set of predictions for both measured (pressure, temperature) and unmeasured states (enthalpy, specific energy, air flow rate, mass flow rate and other states for air/refrigerant in the system) at different uncertainty, pre-defined, and random operating conditions to generate different failure cases, including failures or degradations associated with actuators and/or sensors. The set of predictions is then fed into stage 215 and combined with actual test data to train the machine learning predictive model (Offline) in stage 220.

After installing AReCoS algorithm 120 on the microcontroller (In-Real Time), in stage 230, the physical mathematical model (ODEs) is numerically integrated in real time to provide the same set of measurements defined above. The set of predictions are fed into stage 235 (the optimization engine) to generate the optimal actuator commands that will minimize the energy consumption.

Before sending the optimal actuator commands signals to the actuators (In-Real Time), the set of optimal commands are fed into stage 220 where machine learning model is responsible for modifying the optimal actuator commands signals to avoid potential hardware failure.

In stage 225, the modified actuator commands are fed to the components of the heat pump/chiller. The modified actuator commands can optimize energy consumption while avoiding hardware failure.

Figure 4:
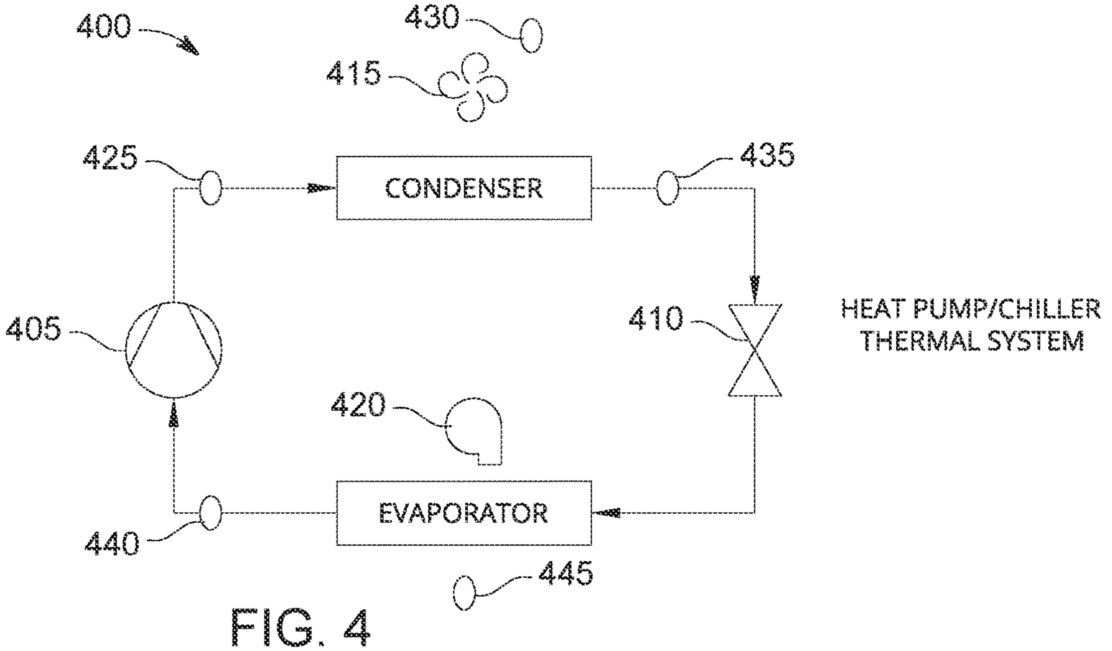
FIG. 4 is a schematic view of the heat pump/chiller thermal system, according to aspects of the present disclosure.
Figure 5:
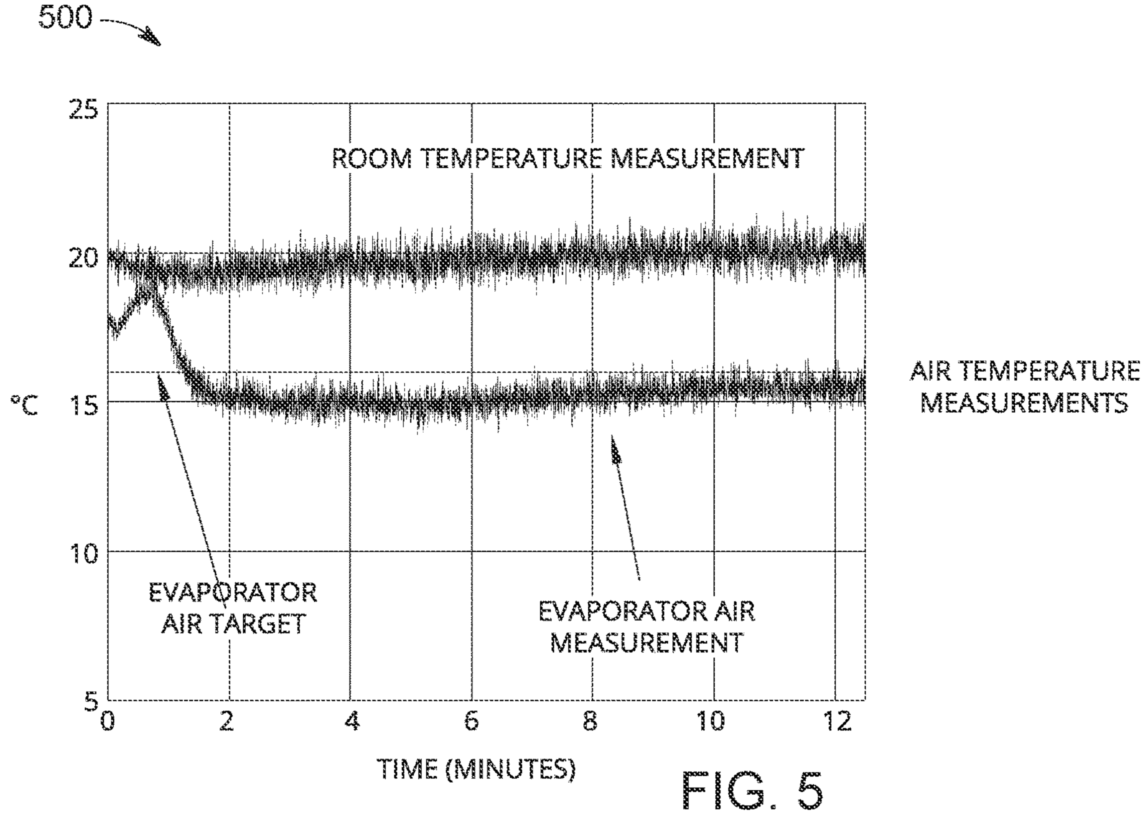
FIG. 5 is a graph of air temperature measurements in a test scenario, according to aspects of the present disclosure.
Figure 6:
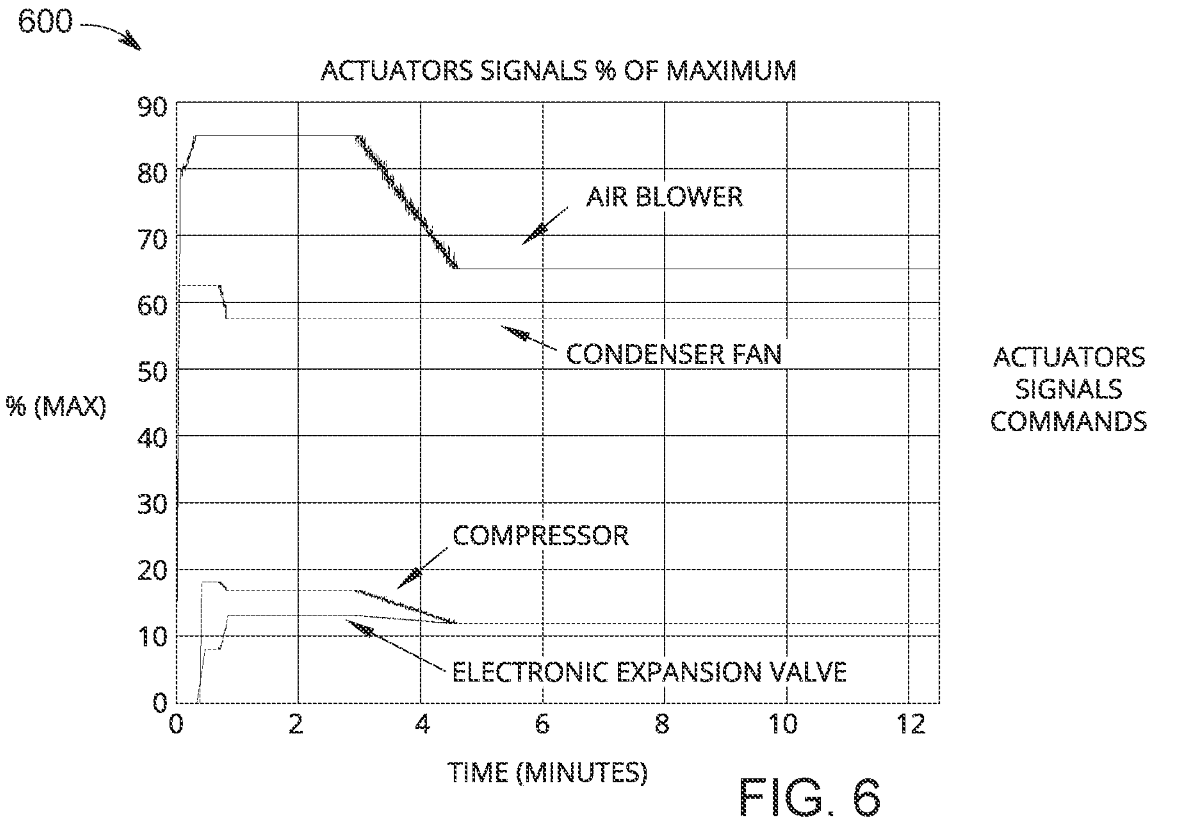
FIG. 6 is a graph of actuator signal commands in the test scenario, according to aspects of the present disclosure.
Figure 7:
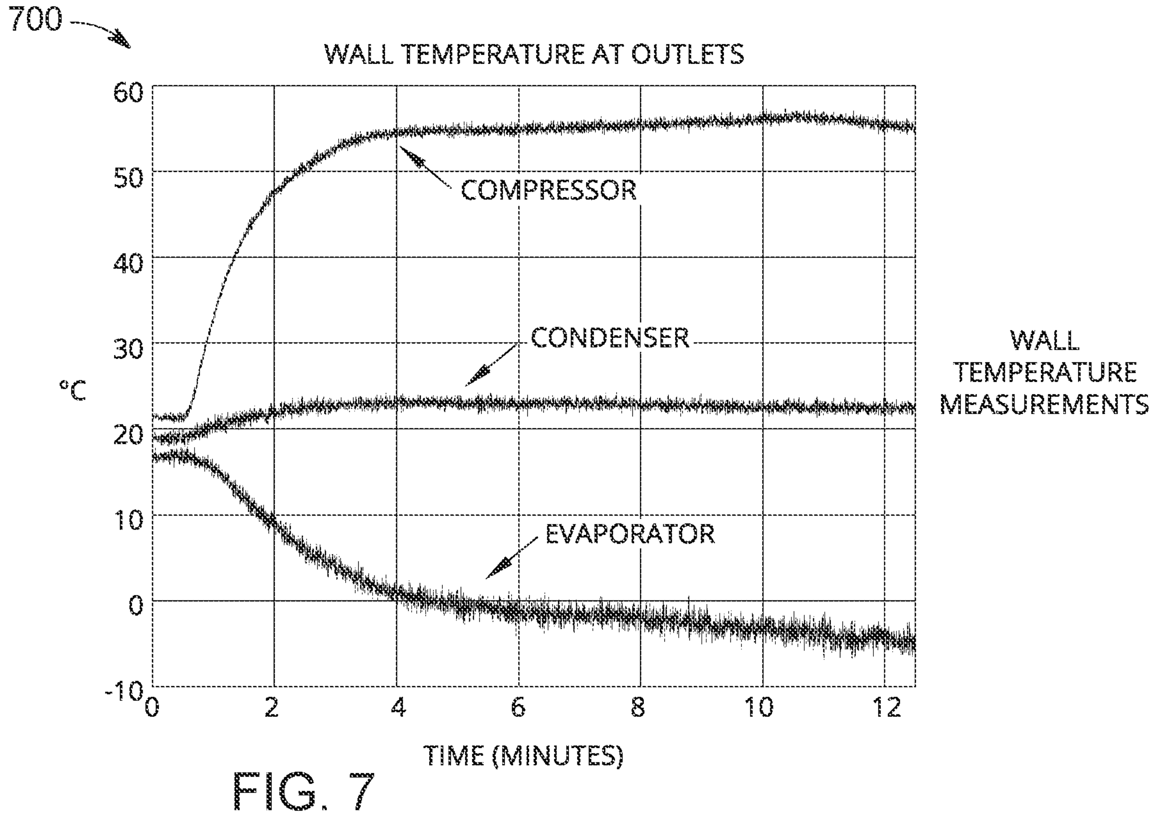
FIG. 7 is a graph of wall temperature measurements in the test scenario, according to aspects of the present disclosure.

FIG. 4 illustrates a test system 100 on which the software 120 was tested, according to aspects of the present disclosure. FIGS. 5-7 illustrate the results of the test, according to aspects of the present disclosure.

As illustrated in FIG. 4, the test system 100 includes an electric compressor 405, an electronic expansion valve 410, an air blower 415, a fan 420, a compressor outlet temperature sensor 425, a room air temperature sensor 430, a condenser outlet temperature sensor 435, an evaporator outlet temperature sensor 440, and an evaporator air temperature sensor 445.

The software 120 communicates with components of the test system 100 to control the operation of the test system 100 and optimize the operation of the test system. For example, the software 120 was installed on an Arduino Mega-2560 microcontroller. As shown in FIGS. 5 and 6, the actuators' signals for the compressor, fan, blower, and electronic expansion valve are shown for the optimal operation of the heat pump/chiller at an ambient temperature of 20 degrees Celsius. The temperature data proves that the developed algorithm can generate simultaneous commanded signals for the actuators that minimize energy consumption. The minimum energy operation is defined by reaching a zero steady-state evaporator air temperature target of 16 Celsius with only ~0.2 C over cooling and steady-state pipe-wall temperatures.

The software 120 developed is capable of optimizing the actuator's signals simultaneously in real-time with the objective of minimizing energy consumption, as shown in FIG. 7. The simultaneous optimization of the actuators is one of the major claims, as no off-the-shelf controller in the residential and commercial HVAC market is providing such a performance or capability. The core functionality and optimality presented here is used to extend the functionality for any heat pump/chiller thermal architectures.

As seen in the test results, the software 120 can achieve energy efficiency during 90-100% of the operating time of heat pump/chiller systems. The software 120 can achieve a 60% reduction in the development and industrialization cost of the software control algorithm compared to the current outdated techniques. The software 120 can eliminate the need for after-installation site re-visit service tuning of proportional-integral-derivative controllers to improve the system performance and, hence, lower the associated labor cost. The software 120 can eliminate the need for access to high-speed internet or cloud storage.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A method for controlling an operation of a vapor-compression thermal system, the method comprising:

receiving sensed condition data from systemic sensors, the condition data comprising one or more of the temperature measurements, pressure measurements, and humidity measurements;

receiving extrinsic condition data comprising location coordinates, and a weather forecast for a future time period;

applying, to an optimization model, the sensed condition data, extrinsic condition data, and predictive thermodynamic state data generated from a mathematical model of the operation of the vapor-compression thermal system, wherein said mathematical model is not connected to the Internet and comprises ordinary differential equations (ODEs) that forecast the predictive thermodynamic states of the vapor-compression thermal system evolving over time, wherein the predictive thermodynamic states are generated through numerical integration of the ODEs in real-time to estimate thermodynamic states of the vapor-compression thermal system that are not directly measured by sensors in real-time, and wherein the optimization model is configured to output simultaneous optimal control commands to operational components of the vapor-compression thermal system;

applying the optimal commands to a failure machine learning model, wherein the failure machine learning module is trained on input comprising failure cases associated with actuators loaded with the predictive thermodynamic states so as to output modified commands that address potential failures in the operational components of the vapor-compression thermal system; and transmitting the modified commands to the operational components of the vapor-compression thermal system.

2. The method of claim 1, wherein the mathematical model is obtained by transforming partial-differential energy equations into the ODEs.

3. The method of claim 2, wherein the predictive thermodynamic states comprise enthalpy, specific energy, air flow rate, and mass flow rate of fluids in the vapor-compression thermal system.

4. The method of claim 1, further comprising:

training the failure machine learning model using training data of the predictive thermodynamic states generated through numerical integration of the mathematical model and measured data obtained during operation of the vapor-compression thermal system.

5. The method of claim 1, further comprising:

wherein the training the failure machine learning model happens without a connection to the Internet.

6. The method of claim 1, wherein the operational components of the vapor-compression thermal system comprise one or more actuators, and the modified commands comprise control signals for the one or more actuators.

7. A computer-readable non-transitory medium storing instructions that cause one or more processors to perform a method, the method comprising:

receiving sensed condition data from systemic sensors, the condition data comprising one or more of the temperature measurements, pressure measurements, and humidity measurements;

receiving extrinsic condition data comprising location coordinates, and a weather forecast for a future time period;

applying, to an optimization model, the sensed condition data, extrinsic condition data, and predictive thermodynamic state data generated from a mathematical model of the operation of the vapor-compression thermal system, wherein said mathematical model is not connected to the Internet and comprises ordinary differential equations (ODEs) that forecast the predictive thermodynamic states of the vapor-compression thermal system evolving over time, wherein the predictive thermodynamic states are generated through numerical integration of the ODEs in real-time to estimate thermodynamic states of the vapor-compression thermal system that are not directly measured by sensors in real-time, and wherein the optimization model is configured to output simultaneous optimal control commands to operational components of the vapor-compression thermal system;

applying the optimal commands to a failure machine learning model, wherein the failure machine learning module is trained on input comprising failure cases associated with actuators loaded with the predictive thermodynamic states so as to output modified commands that address potential failures in the operational components of the vapor-compression thermal system.

8. The computer-readable non-transitory medium of claim 7, wherein the mathematical model is obtained by transforming the partial-differential energy equations into the ODEs.

9. The computer-readable non-transitory medium of claim 8, wherein the predictive thermodynamic states of the vapor-compression thermal system comprise enthalpy, specific energy, air flow rate, and mass flow rate of fluids in the vapor-compression thermal system.

10. A vapor-compression thermal system controller, comprising:

one or more memory devices storing instructions; and one or more processor devices configured to execute the instruction to perform a method comprising:

receiving sensed condition data from systemic sensors, the condition data comprising one or more of the temperature measurements, pressure measurements, and humidity measurements;

receiving extrinsic condition data comprising location coordinates, and a weather forecast for a future time period;

applying, to an optimization model, the sensed condition data, extrinsic condition data, and predictive thermodynamic state data generated from a mathematical model of the operation of the vapor-compression thermal system, wherein said mathematical model is not connected to the Internet and comprises ordinary differential equations (ODEs) that forecast the predictive thermodynamic states of the vapor-compression thermal system evolving over time, wherein the predictive thermodynamic states are generated through numerical integration of the ODEs in real-time to estimate thermodynamic states of the vapor-compression thermal system that are not directly measured by sensors in real-time, and wherein the optimization model is configured to output simultaneous optimal control commands to operational components of the vapor-compression thermal system;

applying the optimal commands to a failure machine learning model, wherein the failure machine learning module is trained on input comprising failure cases associated with actuators loaded with the predictive thermodynamic states so as to output modified commands that address potential failures in the operational components of the vapor-compression thermal system.

* * * * *